United States Patent [19]
Lindsay et al.
[11] 4,257,051
[45] Mar. 17, 1981

[54] APPARATUS AND METHOD FOR DRIVING A MAGNETIC PRINT HEAD

[75] Inventors: Donald S. Lindsay; Charles J. Menk; John A. Popelish, all of Waynesboro, Va.

[73] Assignee: General Electric Company, Waynesboro, Va.

[21] Appl. No.: 965,853

[22] Filed: Dec. 4, 1978

[51] Int. Cl.[3] ........................ G06F 3/14; G03G 19/00
[52] U.S. Cl. ................................ 346/74.5; 346/153.1
[58] Field of Search ....................... 346/153, 155, 74.1

[56] References Cited

U.S. PATENT DOCUMENTS 3,717,460 2/1973 Duck et al. ......................... 346/74.1
3,986,190 10/1976 Schwabe et al. ................... 346/74.1
4,135,195 1/1979 Schloemann ........................ 346/74.1
4,157,553 6/1979 Diddens .............................. 346/153

*Primary Examiner*—Marshall M. Curtis
*Attorney, Agent, or Firm*—Michael Masnik

[57] ABSTRACT

Coincident current windings on a magnetic print head are driven in a special sequence to minimize undesired spurious printing effects otherwise caused by undesirable concentrations of magnetic flux. Rather than energizing all digit windings (in accordance with supplied data values) for each successive energization of a word winding, the digit windings are driven in multiple sub-sets or groups. Only one such sub-set is energized at any given time and the members of each sub-set are chosen to minimize undesired spurious magnetic flux distributions for any given magnetic printing head configuration.

43 Claims, 6 Drawing Figures

APPARATUS AND METHOD FOR DRIVING A MAGNETIC PRINT HEAD

This invention generally involves the printing of latent magnetic images (in accordance with supplied digital data signals) onto a magnetizable medium moving past a magnetic print head which has at least first and second overlapping sets of coincident current windings. In particular, this invention deals with apparatus and method for energizing such windings in a novel sequence which eliminates or minimizes spurious printing effects otherwise caused by spurious magnetic flux distributions.

Magnetic print heads having coincident current windings are knwon in the prior art. For example, print heads having coincident current conductors oriented to record magnetic flux longitudinally (along the direction of relative motion) of a magnetizable surface are disclosed in commonly assigned U.S. Patent Application Ser. No. 716,087 filed Aug. 20, 1976 (now abandoned). An analogous type of print head having conductors oriented to record magnetic flux transverse (to the direction of relative motion) of the magnetizable surface is disclosed in commonly assigned U.S. Pat. No. 4,097,871 issued June 27, 1978. The present invention may be used with any such previously known magnetic print head and the present exemplary embodiment is described specifically with respect to a print head of the type disclosed in the said U.S. Pat. No. 4,097,871.

In general, such magnetic print heads are used to produce latent magnetic images on a magnetizable carrier surface. A magnetic toner material is then transferred in accordance with this latent image to the magnetic carrier and the toner is thereafter transferred to paper or the like to create a visual image. This visual image is fuzed, if required, so as to permanently bond the toner particles onto the paper.

Most, if not all, such magnetic print heads have in the past utilized the so-called dot-line matrix technique for building up characters or other desired complex visual images. Using this well-known dot-line printing technique, the magnetic print head successively prints rows of dots transverse to the moving medium. The actual pattern of dots in any given line is a function of supplied digital data and, after a sufficient number of successive lines have been printed, alpha-numeric characters or other desired complex images will be formed by the resulting matrix of dots.

In most magnetic print heads of this type there are at least two sets of coincident current windings. A first set of so-called "word" windings is distributed in a first linear array along the magnetic print head. Each word winding will normally encompass a plurality of adjacent possible dot printing positions. The second set of so-called "digit" windings is distributed in a second linear array juxtaposed with the first array. However, each digit winding includes portions dimensioned to correspond to the elemental dot printing positions and such portions of each digit winding are distributed at respectively corresponding physical locations within each of the word windings. The arrangement is such that magnetic printing occurrs only at those dot positions where currents are simultaneously flowing in juxtaposed portions of a word winding and a digit winding.

Such arrangements as this have been energized in the past by successively energizing individual windings (either word or digit) and then simultaneously energizing (as might be required by supplied data) *all* windings of the other set (i.e., digit or word). To minimize the number of print line characters which have to be recalled from a buffer storage area to generate the elemental dot-line matrix driving data, the usual past practice has been to successively energize the word windings and to energize all digit windings (as required by the data) during each successive word period.

To minimize the inductance of the word and digit windings, they are usually arranged in a serpentine manner to pass in alternating directions along the print head. That is, any given winding gives rise to alternate directions of magnetic flux as one progresses along the linear array of the print head.

Using these prior print heads and techniques for energizing them, spurious or so-called "bogus" printing effects have been observed. The seriousness of such spurious printing effects is usually a function of the dot pattern being printed and of the particular winding pattern for word and digit windings. Especially serious bogus printing effects have been observed at transitions between word windings for certain print patterns. All of these spurious printing effects are believed due to the spurious magnetic flux distributions which are produced with a given print head configuration for certain printing patterns of dots.

There are several possible solutions to such problems. For example, one could simply arrange to avoid the printing of data patterns which produce these spurious printing effects. However, such limitations are probably unacceptable to most users. Another possible solution would involve the provision of but a single winding for each magnetic printing area thus avoiding the presence of one-half select winding currents at locations where printing is not desired. However, this approach would require separate electrical connections for each such winding and is accordingly much less cost effective and much less reliable than the use of coincident current windings. Another possible approach would be the sequential energization of digit windings coupled with simultaneous energization (in accordance with the data) of the word windings. However, this approach would require an entire print line of data to be available to and processed by the dot-line matrix data generater during the entire line printing process.

However, we have now discovered apparatus and method for substantially avoiding or at least minimizing such bogus printing problems without suffering any such disadvantages as those noted with the other possible solutions mentioned above. In particular, the present invention places no restrictions on the data pattern to be printed and does not require any alterations to the physical print head configuration itself. Rather, the invention involves a change in the electronic drive circuits for energizing the word and digit windings in a novel sequence which minimizes spurious magnetic flux distributions along the print head.

In general, this invention reduces the accumulative unbalance and/or coupling of undesirable magnetic flux at word winding transitions and also insures that adjacent elemental printing areas are not energized simultaneously.

The word windings are still sequentially energized substantially as in the past. However, during the time that each word winding is energized, only predetermined sub-sets of the digit windings are energized at any given time. For example, the digit windings are divided into plural sub-sets which are sequentially energized (in accordance with the supplied data) during each word interval. To minimize energy dissipation in the windings and driving circuits, each word winding is preferably repeatedly energized for each successive sub-set of digit windings.

In addition to such sequential activation of digit winding sub-sets, a given sub-set of digit windings is preferably substantially uniformly distributed physically along the length of each word winding. Furthermore, such sub-sets are preferably chosen to maximize the distance between elemental print areas which may be energized simultaneously and which also have the same relative flux polarity.

In the transverse recording head design used with the exemplary embodiment, alternate flux gaps have like polarities so that odd groupings provide the maximum distance between gaps having like flux polarities. Such groupings also insure that adjacent gaps are not energized simultaneously and they tend to cancel the accumulation of undesirable flux at word winding transitions. In the exemplary embodiment, there are 42 word windings and 38 digit windings. Significantly improved printing characteristics were observed when the digit windings were separated into three groups and when each of the three groups were sequentially energized in accordance with supplied data:

Group No. 1=digit windings 1, 4, 7, 10, 13, 16, 19, 22, 25, 28, 31, 34 and 37;

Group No. 2=digit windings 2, 5, 8, 11, 14, 17, 20, 23, 26, 29, 32, 35 and 38;

Group No. 3=digit windings 3, 6, 9, 12, 15, 18, 21, 24, 27, 30, 33 and 36.

These as well as other objects and advantages of this invention will be more completely understood and appreciated by studying the following detailed description of the presently preferred exemplary embodiment taken in conjunction with the accompanying drawings of which:

Figure 1:
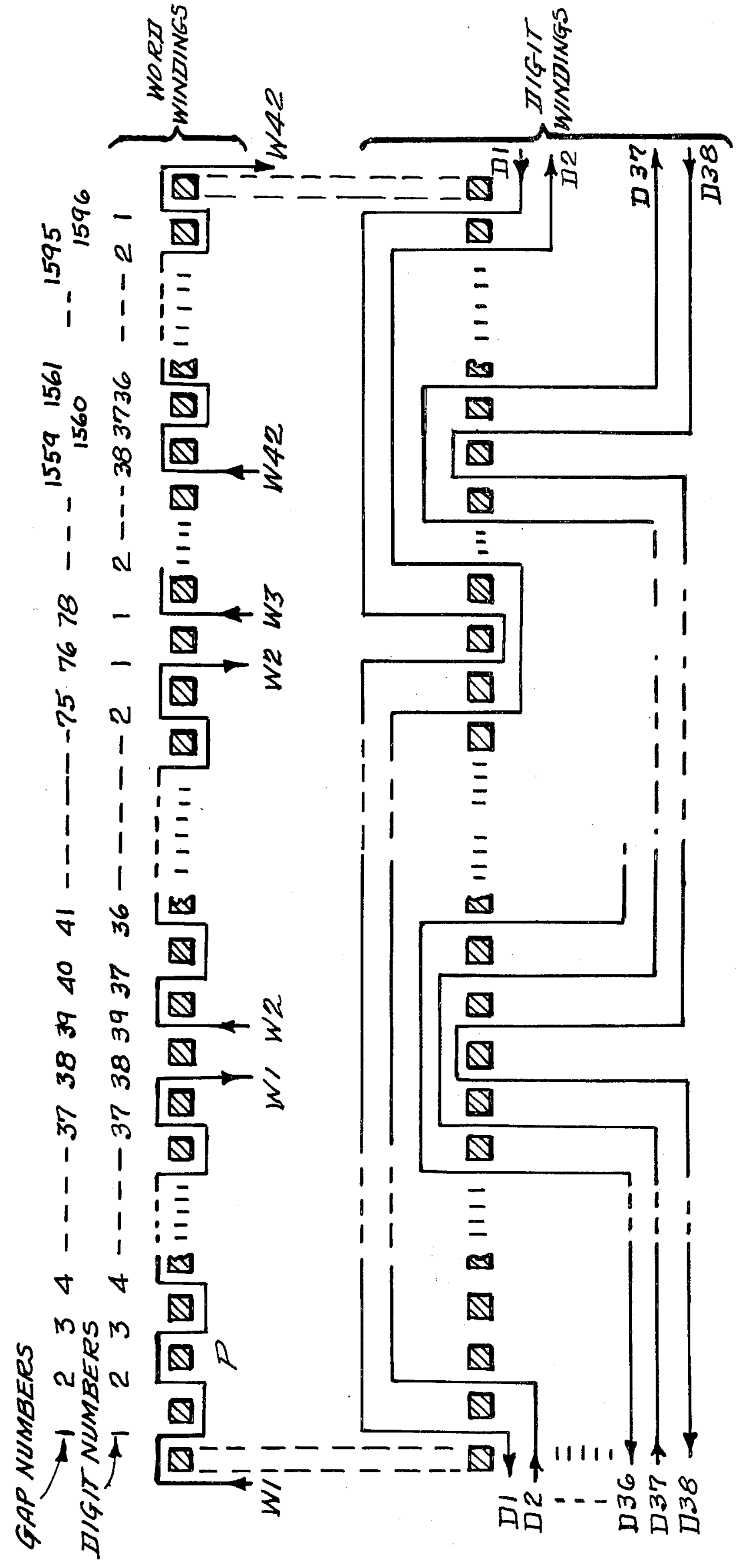
FIG. 1 is a schematic depiction of the coincident current word and digit windings and magnetic poles associated with a typical transverse magnetic printing head.

The transverse magnetic print head shown in FIG. 1 is generally like those described in U.S. Pat. No. 4,097,871. In this particular embodiment, there are 42 word windings distributed in a first linear array along the length of the print head. As shown in FIG. 1, each work winding is passed in alternate directions through the 38 adjacent gaps formed by the magnetic pole pieces P. There are a total of 1,596 gaps numbered as shown in FIG. 1 and also having associated digit numbers as shown in FIG. 1. The same magnetic pole pieces P are shown in the lower half of FIG. 1 with the digit windings superimposed over or otherwise juxtaposed with the word windings in a second linear array along the length of the print head. As shown, each digit winding passes through only one gap associated with each word winding. To minimize the complexity of interconnections between the various segments of each digit winding, the order in which the digit windings pass through the gaps associated with each word is inverted with every other word. For example, as shown by the digit numbers of the gaps, gap 38 in word 1 is the right most gap while gap 38 in word 2 is the left most gap. Within word 3, gap 38 would again be the right most gap, etc.

Figure 4:
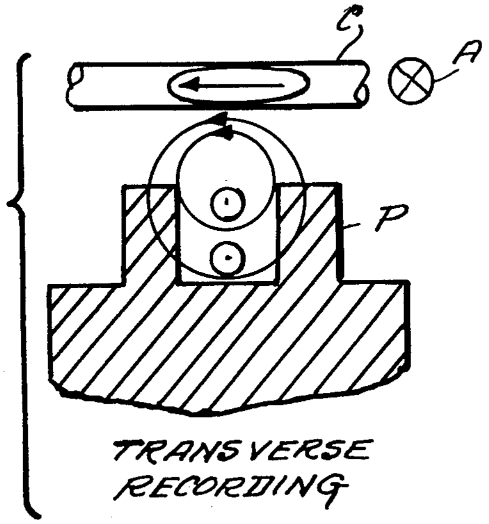
FIG. 4 is a cutaway schematic view illustrating the transverse recording techniques employed by the head of FIG. 1.

As may be appreciated by observing FIG. 1, when any given word winding and digit winding are energized, a single one of the 1,596 gaps will have two coincident currents passing therethrough which, in turn, gives rise to a sufficient magnetic flux to cause the printing of a latent magnetic image in a magnetic carrier disposed in the proximity of the gap. For example, as shown in FIG. 4, a magnetizable carrier C is moved transversely with respect to the linear print head in the direction of arrow A into the plane of FIG. 4. If coincident currents pass out of the plane of FIG. 4 in both the digit and word windings of a given slot, then sufficient magnetic flux will be developed in a direction transverse to the direction of relative motion to record a latent magnetic image within the carrier C all as shown in FIG. 4.

Figure 5:
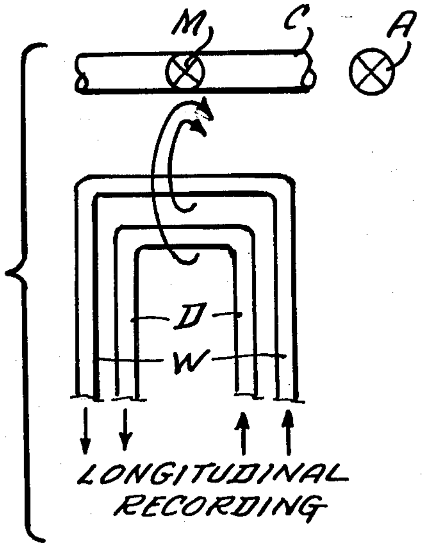
FIG. 5 is a cutaway schematic showing the longitudinal recording techniques used with other conventional magnetic printing heads with which this invention may be used.

On the other hand, if the digit winding D and word winding W have effective recording portions oriented as shown in FIG. 5, then the magnetic flux about the effective portions of these windings will cause the recording of a latent magnetic image in a longitudinal direction along the direction of relative motion with respect to the carrier C. Although the spurious flux distributions specifically described in detail here are with respect to the transverse recording head of FIG. 1, similar problems also exist with the longitudinal recording arrangement of FIG. 5 and they may also be solved in accordance with this invention. Actually, with longitudinal recording, the undesirable magnetic flux accumulations at the boundaries of word windings are generally perpendicular to the alignment direction of magnetizable oxide particles in the magnetic carrier thus causing these stray fields to have even more damage potential. In particular, in a longitudinal recording arrangement such as that of FIG. 5, the magnetizable oxide of the carrier C is normally saturated in a direction parallel to the direction of relative motion indicated by arrow A. Recording is effected by magnetization in the opposite direction as indicated by arrow M in the carrier C. Spurious magnetic flux is generally oriented perpendicular to both arrows A and M thus tending to demagnetize both the background saturation as well as the recorded data near areas of the print head where undesired flux accumulations occur. In this instance, the damage to the printed image may well take the form of lost or weakened dots rather than the recording of extra or "bogus" dots as in the case of transverse recording. Nevertheless, the longitudinal recording process of FIG. 5 can be improved in accordance with this invention in substantially the same manner as the transverse recording process which is described in detail with the presently preferred exemplary embodiment.

As mentioned above, the coincident current winding arrangement in a magnetic print head limits the current levels that may be used in each of the coincident current windings and also produces some potentially unacceptable side effects in the printing results due to interactions between adjacently energized printing areas.

Figure 3:
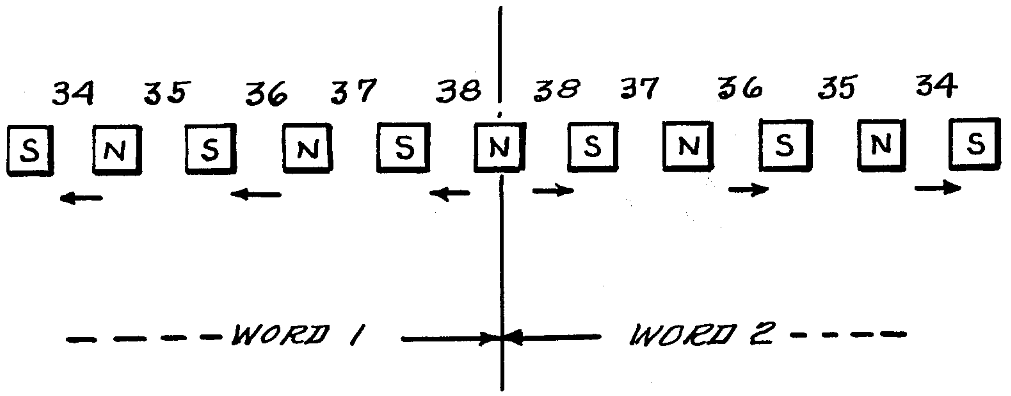
FIG. 3 is a schematic diagram of the magnetic flux present in the head of FIG. 1 when alternate digit windings are energized.

It has been observed that bogus dot printing may result with the transverse head of FIG. 1 when printing some data patterns. Energizing only alternate gaps (e.g., printing an alternate dot pattern) is a worse case which causes bogus (excessive sized) printing at the transitions between word windings. This is caused by the unbalance and cumulative addition or coupling of flux in the magnetic circuit of the print head. For example, the magnetic flux resulting from the energization of alternate digit windings is shown in FIG. 3. Since the magnetic field changes direction (i.e., polarity) at the transition between word windings, the intensity of the undesirable or spurious magnetic flux is greatest at these transitions. Thus, the force on the magnetic toner particles is excessive and larger than desired amounts of toner are transferred to the magnetic carrier and hence to the paper in such transitional areas.

Figure 2:
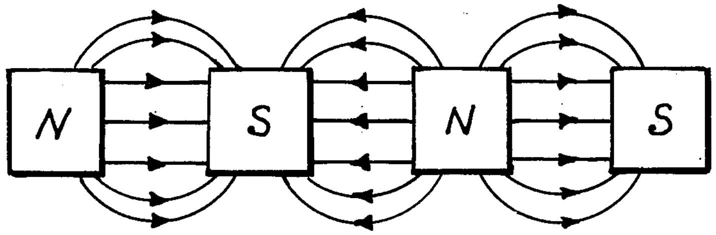
FIG. 2 is a schematic drawing of magnetic flux lines between adjacent energized magnetic poles in the print head of FIG. 1.

The actual size of the printed image (i.e., dot) is also sensitive to the data pattern being printed, especially when adjacent gaps are simultaneously energized in the head of FIG. 1. Such simultaneous energization of adjacent gaps occurs, the magnetic field is as shown in FIG. 2. The flux emanating from the pole face between adjacent energized gaps is forced to divide between the fixed available area of one shared pole face. This results in the effective width (along the direction of the print head) of each recorded image (i.e., dot) being less than the recorded image dimension which results when essentially isolated gaps are energized. In this latter case, the magnetic flux associated with a given print dot emanates from the entire available surface of the pole faces thus producing a larger recorded dot image.

The ideal solution to these problems involving spurious magnetic flux distributions would be to energize but a single gap of the print head at any given time. This could be achieved, of course, by providing separate winding for each print gap but it would represent a tremendous increased cost and lower reliability than the coincident current winding approach. The disadvantages of several other possible solutions have already been mentioned.

This invention effects a novel sequential energization of the coincident current windings in a magnetic print head so as to minimize or even avoid spurious magnetic flux distributions within the head. Further this solution may be realized wholly within the electronic driving circuits thus leaving the word and digit windings of the print head intact according to presently preferred construction techniques. Such an electronic solution to the problem provides a very cost effective method for reducing or eliminating undesirable magnetic flux distributions along the print head by tending to isolate simultaneously energized elemental print areas.

In general, this invention sequentially activates subsets of the digit winding with the various sub-sets being selected so as to increase the physical distance between digit windings that may be simultaneously energized. As should be appreciated, this tends to isolate the magnetic gaps which may be energized at any given time thus approaching the ideal solution of energizing only one gap at any given time. In addition to such sequential activation of digit winding sub-sets, each sub-set is preferably chosen so that its members are substantially uniformly distributed along each word winding. Furthermore, the members of each sub-set of digit windings have been chosen to maximize the distance between print gaps having the same magnetic flux polarity to be energized simultaneously.

In the exemplary transverse head design of FIG. 1, alternate printing gaps have like flux polarities. Accordingly, increased distance between gaps having the same flux polarity in any given sub-set is obtained by having an odd number of sub-sets. At the same time, such an odd numbered grouping also insures against simultaneous energization of adjacent gaps. Accumulated spurious magnetic flux at the transition between word windings also tends to be cancelled by following such design criteria. Since it is impossible to energize adjacent gaps simultaneously, magnetic flux emanates from the entire area of the pole pieces on either side of an energized gap thus making the largest possible and most uniform (dot) image on the moving magnetic belt. The transverse recording head of FIG. 1 includes 42 word windings and 38 digit windings. Following the above design criteria, the preferred exemplary embodiment involves grouping the 38 digit windings into three subsets or groups of sequentially energized digit windings. These three sub-sets or groups of sequentially energized digit windings are: Group No. 1=digit windings 1, 4, 7, 10, 13, 16, 19, 22, 25, 28, 31, 34 and 37; Group No. 2=digit windings 2, 5, 8, 11, 14, 17, 20, 23, 26, 29, 32, 35 and 38; and Group No. 3 digit windings 3, 6, 9, 12, 15, 18, 21, 24, 27, 30, 33 and 36.

Figure 6:
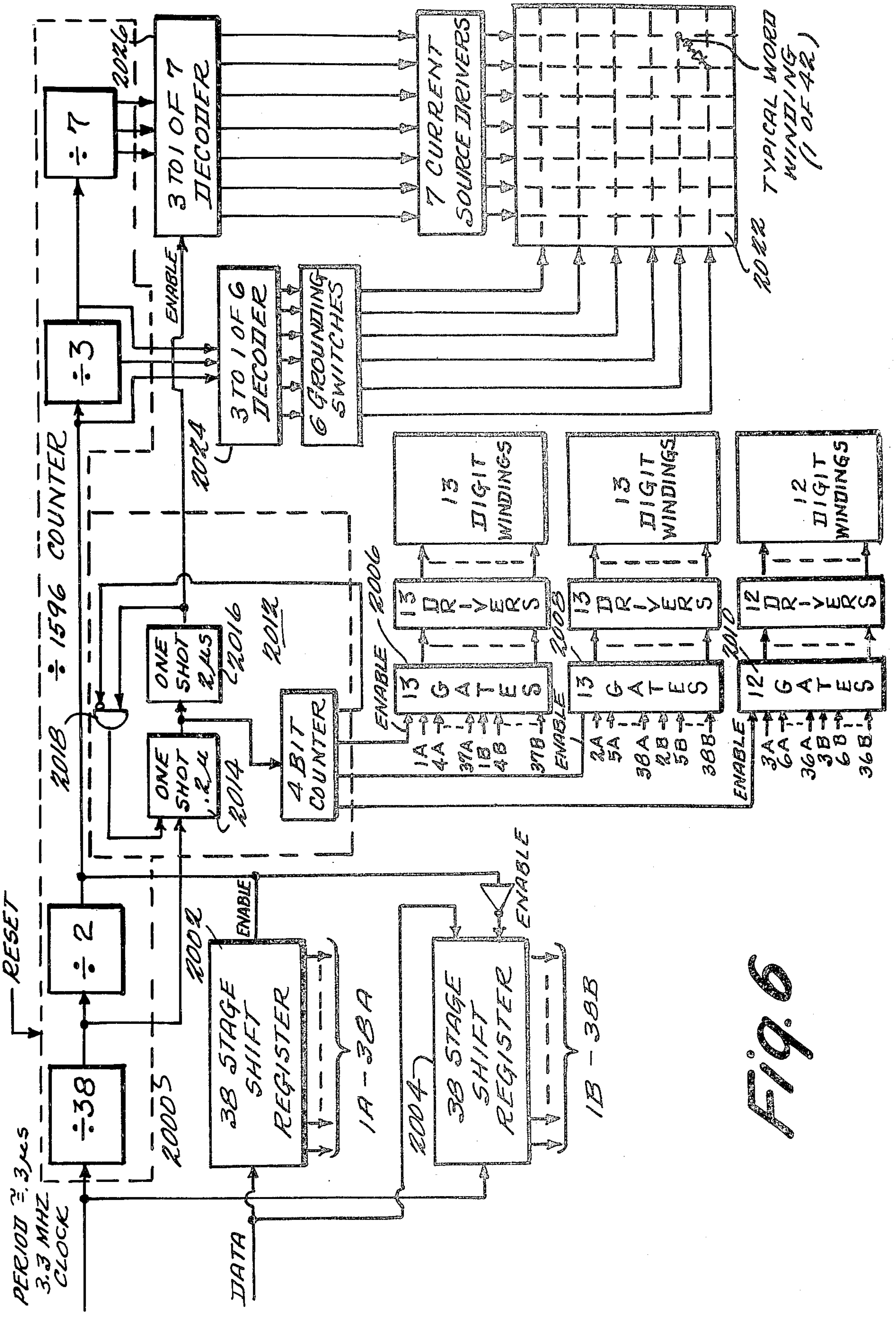
FIG. 6 is a schematic diagram of an exemplary electronic driving circuit in accordance with this invention for the magnetic printing head of FIG. 1.

The presently preferred exemplary embodiment of electronic circuitry for driving the print head of FIG. 1 in accordance with this invention is shown in FIG. 6. Data signals and synchronized clock signals are conventionally supplied to the driver of FIG. 6. The clock pulses are counted in a counter 2000 which is connected to have a maximum count of 1,596 (equal to the total number of gaps in the print head). This is also equal to the product of the number of word windings times the number of digit windings. Counter 2000 may itself be conventionally realized using standard commercially available integrated circuits (e.g., type 74LS93) connected so as to provide desired inter-stage outputs as shown in FIG. 6 and to automatically reset itself after each 1,596 clock pulses. As also shown in FIG. 6, suitable conventional reset connections may be utilized for insuring that the counter 2000 is properly synchronized with the incoming data and clock signals.

In the exemplary embodiment, data is serially provided on the data line and shifted into one of the shift registers 2002 or 2004. Each of these shift registers includes 38 digital stages for storing data corresponding to the 38 digit windings. Since the digit windings are inversely ordered in adjacent words (as shown in FIG. 1), two shift registers are provided and the data is shifted in from the left on one (2002) and is shifted in from the (opposite) right end of the other (2004). Accordingly, the parallel inter-stage outputs from the shift registers 1A–38A and 1B–38B are automatically arranged in the proper sequence for energizing the digit lines during alternating word intervals. As also shown in FIG. 6, the shift registers 2002 and 2004 are alternately enabled by a control signal from counter 2000 such that while data is being shifted into one register, the data earlier shifted into the other register is being utilized in a printing process over one word length of the print head. In the next cycle of operation, the role of shift registers 2002 and 2004 will be reversed as should now be apparent. The shift registers themselves may be realized from conventional integrated circuit components, (e.g. type 74LS299).

As indicated in FIG. 6, the parallel outputs from shift registers 2002 and 2004 are segregated into three sub-sets and each sub-set is connected to the inputs of a corresponding group of gates 2006; 2008; and 2010. Only one such group of gates is enabled at any given time by the three output lines from a sequential pulse signal generator 2012. This pulse generator is itself triggered into activity and automatically thereafter sequentially activates the three enable output lines each time counter 2000 counts 38 clock pulses. The count of 38 clock pulses indicates that one of the shift registers has been filled and that another print cycle may thus begin while the other shift register is again being filled with fresh data.

The particular sequential pulse generator 2012 shown in FIG. 6 comprises two one-shot or monostable circuits 2014 and 2016 connected in an oscillatory feedback loop. That is, when one shot 2014 is triggered, its output, in turn, triggers one-shot 2016 whose output, in turn, passes through gate 2018 (if enabled) and retriggers one-shot 2014. The output from one-shot 2014 is counted in a four-bit counter 2020 which has four different outputs corresponding respectively to its four different possible states. Four-bit counter 2020 is normally in a state which disables gate 2018. However, the first triggering of one-shot of 2014 moves counter 2020 off this state and onto another state which enables the first one of the gate groups 2006; 2008; and 2010. Each successive triggering of one-shot 2014 moves the counter 2020 to a different successive state which causes a corresponding different successive group of gates to be enabled as should now be apparent. After three cycles of this operation, the counter 2020 again lands on its initial starting state which disables gate 2018 and prevents any further oscillations of the loop comprising the one shots 2014 and 2016. One-shots 2014 and 2016 may be conventionally realized by commercially available integrated circuits (e.g., 74LS123) and the four-bit counter 2020 can be similarly realized by the use of conventional counter connected flip-flop circuits (e.g., 74LS74).

In the exemplary embodiment, clock and data signals are supplied at a nominal 3.3 mHz rate which means that a new word of 38 bits is available approximately every 12 microseconds. An actual printing sequence for a given word (a maximum of 38 dots) takes approximately 7–8 microseconds in the exemplary embodiment. This timing is achieved by the time periods of one-shots 2014 and 2016. The time period of the first one-shot 2014 is relatively small (e.g., 0.2 microseconds) while that of one-shot 2016 is relatively longer (e.g., approximately 2 microseconds) and corresponds to the inverval during which coincident digit and word windings are to be energized so as to result in the printing of a latent magnetic image. As shown in FIG. 6, the output of one-shot 2016 is actually used to enable the current drive to word windings so that any given word winding is repeatedly energized at intervals corresponding to the successive energization of the three sub-sets of digit windings. This minimizes unnecessary energy dissipation in the word windings and/or in the circuitry associated with the driving of such windings.

The outputs 1A–38A and 1B–38B of the shift registers are preferably of the tri-state type, that is, effectively high impedance connections while the shift register is being filled so that transitory contents of the shift register currently being filled do not influence the output of the gates 2006; 2008; and 2010. The gates may also be realized from conventional integrated circuits (e.g., MC3492). The 38 current drivers and digit winding shown in FIG. 6 are also of conventional design.

To minimize the number of decoders and current drivers required for the 42 word windings, each of these windings is preferably connected in a diode switched matrix 2022 as shown in FIG. 6. This 6×7 matrix is of a conventional type which should be familiar to those in the art. The six rows of the matrix 2022 are driven from the inter-stage outputs of counter 2000 by a "3 to 1 of 6" decoder 2024 while the columns of the matrix 2022 are driven by other inter-stage outputs of the counter 2000 through the "3 to 1 of 7" decoder 2026. The decoders 2024 and 2026 may be realized by conventional integrated circuits (e.g., 74LS138).

Those in the art will appreciate that FIG. 6 is a functional schematic diagram and that an actual detailed circuit will include various additional gates, inverters, and other logic elements as required by conventional digital circuit design techniques. For example, the incoming clock and data signals are preferably passed through circuits which properly terminate the incoming signal lines and provide appropriate voltage and current levels for the driving circuitry of FIG. 6. An integrated circuit of the type 8820A is commonly used for such purposes. Many alternate ways of realizing the sequential pulse generator 2012 will also be apparent to those in the art. The enable input to decoder 2026 might be obtained in other ways such as, for example, through a three input OR gate connected to the various enable outputs of counter 2020.

In operation, alternate printing data words of 38 bits each are shifted into registers 2002 and 2004. While data is being shifted into one register, the contents of the other register is used in a word printing cycle. Each word printing cycle involves the successive separate energization of one of three sub-sets of digit windings in accordance with the supplied data. Throughout this cycle or at repeated intervals coincident with the possible energization of any given sub-set of digit windings, selected one of the word windings is also energized. This whole sequence of operation is repeated for each successive one of the 42 word windings whereby an entire line of dot images is printed in approximately 500 microseconds. A new print word of data arrives approximately every 12 microseconds and this data is subsequently printed in approximately 7–8 microseconds during which three sub-sets of digit windings are sequentially energized in accordance with the data.

While only one exemplary embodiment of this invention has been described in detail, those in the art will appreciate that there are many variations and modifications that may be made in this exemplary embodiment without departing from the novel and advantageous features of this invention. The invention is generally useful with all types of magnetic print heads having coincident current windings and including both the transverse and longitudinal type of magnetic print heads. All such variations and modifications are intended to be included within the scope of this invention as defined by the following claims.

What is claimed is:

1. An electronic circuit for driving at least first and second sets of coincident current windings on a magnetic print head in accordance with supplied printing data signals, said circuit comprising:

first drive means connected to successively energize different ones of said first set of windings, and second drive means for selectively energizing said second set of windings, means for minimizing undesirable concentrations of magnetic flux during printing comprising means for controlling said second drive means to successively energize different predetermined sub-sets of said second set of windings, in accordance with said supplied data signals, while each of the first set of windings is energized by said first drive means.

2. An electronic circuit as in claim 1 wherein successive areas of the head are magnetized with opposite polarity when energized for printing and wherein said predetermined sub-sets comprise only windings associated with head areas that are separated from other like-polarized head areas by at least one like-polarized area thus increasing the distance between areas having the same polarity that may be energized simultaneously.

3. An electronic circuit as in claim 1 wherein each of said predetermined sub-sets comprise windings substantially uniformly spaced within the dimensions of any given one winding of said first set.

4. An electronic circuit as in any of claims 1–3 wherein:

said magnetic printing head comprises a linear array of slots, said first set of windings comprise plural word windings N, each word winding passing in alternating directions through a number M of said slots, said second set of windings comprise a plurality M of ordered digit windings M1, M2, M3, . . . each digit winding passing in alternating directions through successive respectively corresponding slots associated with each of the N word windings such that coincident passage of currents through selected word and digit windings provides magnetic printing associated with correspondingly selected slots where the resultant magnetic flux exceeds a predetermined threshold value, the digit windings passing through the last slot associated with a word winding also passing through the first slot associated with the next succeeding word winding and said predetermined sub-sets comprising a first sub-set including M1, M4, M7, . . . digit windings, a second sub-set including M2, M5, M8 . . . digit windings and a third sub-set including M3, M6, M9, . . . digit windings.

5. An electronic circuit as in any of claims 1–3 wherein said windings are disposed to record magnetic flux directed in substantial longitudinal alignment with the motion of a magnetizable surface as it passes by said magnetic printing head.

6. An electronic circuit as in any of claims 1–3 wherein said windings are disposed to record magnetic flux directed substantially transverse to the motion of a magnetizable surface as it passes by said magnetic print head.

7. An electronic circuit as in any of claims 1–3 and 6 wherein said first drive means repeatedly energizes a given one of the windings of said first set during the successive energization of said predetermined sub-sets of windings and subsequently repeatedly energizes the next successive winding of said first set of windings during the successive energization of said predetermined sub-sets of windings and so forth until each winding of said first set has been so energized in succession.

8. An electronic circuit as in any of claims 1–3 and 6 wherein synchronized clock signals are supplied with said data signals and a digital counter means is connected to count said clock signals, and wherein said first drive means comprises:

decoding and current driving means connected to drive current through successive different ones of the first set of windings as a predetermined function of the number of clock signals counted by said digital counter means.

9. An electronic circuit as in claim 8 wherein said decoding and current driving means comprises a diode switching matrix having rows and columns driven by successive corresponding stages of said digital counter means.

10. An electronic circuit as in any of claims 1–3 and 6 wherein synchronized clock signals are supplied with said data signals and a digital counter means is connected to count said clock signals and wherein said second drive means comprises:

at least one register means for receiving and storing said data signals, said register means having a number of stages at least equal to the number of windings in said second set, start means connected to provide a start signal each time said register means is refilled with new data from said data signals, a sequential signal generator connected to being an operation cycle upon the occurrence of said start signal and providing a sequence of time-spaced signals thereafter, plural gating means, each of which is connected to receive signals from a respectively corresponding group of said stages and to pass plural gated signals corresponding to the respective group of stages in response to the occurrence of a respectively corresponding one of said time-spaced signals, and a current driving means connected to drive current through a respectively corresponding one of said windings of the second set in response to a respectively corresponding one of said gated signals.

11. An electronic circuit as in claim 10 wherein said register means comprises two shift registers, one of which provides buffer storage while the data already stored in the other shift register is used to generate appropriate drive currents for the second set of windings.

12. An electronic circuit as in claim 11 wherein said two shift registers are connected to shift said data signals from opposite directions.

13. An electronic circuit as in claim 11 wherein said sequential signal generator also provides an enable signal corresponding to each of said time-spaced signals, each enable signal having a duration corresponding to the desired duration of energizing a winding of said first set and being connected to said first drive means so as to effect such a desired duration of energization.

14. An electronic circuit as in claim 13 wherein said first drive means comprises:

decoding and current driving means connected to drive current through successive different ones of the first set of windings as a predetermined function of the number of clock signals counted by said digital counter means.

15. An electronic circuit as in claim 14 wherein said decoding and current driving means comprises a diode switching matrix having rows and columns driven by successive corresponding stages of said digital counter means.

16. An electronic circuit as in claim 13 wherein said sequential signal generator comprises:

two cascaded monostable circuits, the first of which is initially triggered each time the digital counter means counts a predetermined number of clock signals and which thereafter is triggered by the output of the second monostable circuit, and a multistage counter connected to receive the output of at least one of said monostable circuits and having plural output lines on which respectively corresponding ones of said time-spaced signals appear.

17. Apparatus for recording magnetic images in accordance with supplied digital data signals onto a moving magnetizable medium, said apparatus comprising:

a magnetic print head adapted for juxtaposition with said moving magnetizable medium and including first and second overlapping sets of coincident current windings, first current driving means connected to successively energize different ones of said first set of windings, and second current driving means for selectively energizing said second set of windings, means for minimizing undesirable concentrations of magnetic flux during printing comprising means for controlling said second current driving means to successively energize different predetermined sub-sets of said second set of windings, in accordance with said supplied data signals, while each of the first set of windings is energized by said first drive means.

18. Apparatus as in claim 17 wherein successive areas of the head are magnetized with opposite polarity when energized for printing and wherein said predetermined sub-sets comprise only windings associated with head areas that are separated from other like-polarized head areas by at least one like-polarized area thus increasing the distance between areas having the same polarity that may be energized simultaneously.

19. Apparatus as in claim 17 wherein each of said predetermined sub-sets comprise windings substantially uniformly spaced within the dimensions of any given one winding of said first set.

20. Apparatus as in any of claims 17–19 wherein said windings are disposed to record magnetic flux directed in substantial longitudinal alignment with the motion of a magnetizable surface as it passes by said magnetic printing head.

21. Apparatus as in any of claims 17–19 wherein said windings are disposed to record magnetic flux directed substantially transverse to the motion of a magnetizable surface as it passes by said magnetic printing head.

22. Apparatus as in any of claims 17–19 and 21 wherein said-first drive means repeatedly energizes a given one of the windings of said first set during the successive energization of said predetermined sub-sets of windings and subsequently repeatedly energizes the next successive winding of said first set of windings during the successive energization of said predetermined sub-sets of windings and so forth until each winding of said first set has been so energized in succession.

23. Apparatus as in any of claims 17–19 and 21 wherein synchronized clock signals are supplied with said data signals and a digital counter means is connected to count said clock signals and wherein said second drive means comprises:

at least one register means for receiving and storing said data signals, said register means having a number of stages at least equal to the number of windings in said second set, start means connected to provide a start signal each time said register means is refilled with new data from said data signals, a sequential signal generator connected to begin an operation cycle upon the occurrence of said start signal and providing a sequence of time-spaced signals thereafter, plural gating means, each of which is connected to receive signals from a respectively corresponding group of said stages and to pass plural gated signals corresponding to the respective group of stages in response to the occurrence of a respectively corresponding one of said time-spaced signals, and a current driving means connected to drive current through a respectively corresponding one of said windings of the second set in response to a respectively corresponding one of said gated signals.

24. Apparatus as in claim 23 wherein said register means comprises two shift registers, one of which provides buffer storage while the data already stored in the other shift register is used to generate appropriate drive currents for the second set of windings.

25. Apparatus as in claim 24 wherein said sequential signal generator also provides an enable signal corresponding to each of said time-spaced signals, each enable signal having a duration corresponding to the desired duration of energizing a winding of said first set and being connected to said first drive means so as to effect such a desired duration of energization.

26. Apparatus as in claim 25 wherein said first drive means comprises:

decoding and current driving means connected to drive current through successive different ones of the first set of windings as a predetermined function of the number of clock signals counted by said digital counter means.

27. Apparatus as in claim 25 wherein said sequential signal generator comprises:

two cascaded monostable circuits, the first of which is initially triggered each time the digital counter means counts a predetermined number of clock signals and which thereafter is triggered by the output of the second monostable circuit, and a multistage counter connected to receive the output of at least one of said monostable circuits and having plural output lines on which respectively corresponding ones of said time-spaced signals appear.

28. A method of printing magnetic images in accordance with supplied digital data signals onto a magnetizable medium moving past a magnetic print head having first and second overlapping sets of coincident current windings, said method comprising the steps of:

successively energizing different ones of said first set of windings, and selectively energizing said second set of windings, minimizing undesirable concentrations of magnetic flux during printing comprising controlling said selective energization of said second set of windings to successively energize different predetermined sub-sets of said second set of windings, in accordance with said supplied data signals, while each of the first set of windings is energized.

29. A method as in claim 28 wherein successive areas of the head are magnetized with opposite polarity when energized for printing and wherein said predetermined sub-sets comprise only windings associated with head areas that are separated from other like-polarized head areas by at least one like-polarized area thus increasing the distance between areas having the same polarity that may be energized simultaneously.

30. A method as in claim 28 wherein each of said predetermined sub-sets comprise windings substantially uniformly spaced within the dimensions of any given one winding of said first set.

31. A method as in any of claims 28–30 wherein said windings are disposed to record magnetic flux directed in substantial longitudinal alignment with the motion of a magnetizable surface as it passes by said magnetic printing head.

32. A method as in any of claims 28–30 wherein said windings are disposed to record magnetic flux directed substantially transverse to the motion of a magnetizable surface as it passes by said magnetic printing head.

33. A method as in any of claims 28–30 and 32 wherein a given one of the windings of the first set is repeatedly energized during the successive energization of each of said predetermined sub-sets and subsequently the next successive winding of the first set is repeatedly energized during the successive energization of each of said predetermined sub-sets and so forth until each winding of said first set has been so energized in succession.

34. An electronic circuit for accepting supplied clock and data signals and utilizing same to drive N word windings distributed in a first linear array along a magnetic printing head and to drive M digit windings distributed in a second linear array juxtaposed with the first array, where each digit winding includes a portion of each word winding at a respectively corresponding physical location, said electronic circuit comprising:

a digital counter connected to count said clock signals and to provide interstage output signals representative of predetermined counter contents, at least one data register having at least M digital stages connected to receive and store said data signals and to provide M data outputs representative of the register contents, at least two groups of gates, each group of gates being connected to pass a respectively corresponding predetermined sub-set of said M data outputs in response to an enable gating signal, means for minimizing undesired spurious effects due to energization of groups of adjacent digit windings comprising a sequential signal generator connected to provide sequential enable gating signals to said groups of gates in response to a first predetermined counter contents whereby data output signals are passed at any given time by no more than one group of gates, corresponding to one predetermined sub-set of said M data outputs, M digit winding current drivers, each being connected to drive a corresponding digit winding in response to a data output gated by a respectively corresponding one of said gates, plural word winding current drivers connected to said word windings, a decoder connected to selectively and successively activate different ones of said word winding current drivers in accordance with corresponding predetermined successive counter contents.

35. An electronic circuit as in claim 34 wherein the contents of said counter repeats every N x M clock signals, said first predetermined counter contents corresponds to counting M clock signals and said decoder causes energization of a different word winding each time M clock signals are counted.

36. An electronic circuit as in claim 34 wherein the duration of each enable gating signal is substantially less than the period of M clock signals divided by the number of groups of gates.

37. An electronic circuit as in claim 34 wherein said decoder is enabled only at substantially the same times as any group of gates is enabled whereby the same word winding is repeatedly energized a number of times equal to the number of groups of gates before the next succeeding word winding is energized.

38. An electronic circuit as in claim 34 wherein said sequential signal generator comprises an oscillatory loop connected pair of monostable circuits and a second counter connected to count the outputs of at least one of the monostable circuits and to provide said sequential enable gating signals on respectively corresponding output lines as a function of the contents of said second counter.

39. An electronic circuit as in claim 38 wherein said sequential signal generator further comprises a logic element connected in said oscillatory loop for inhibiting further oscillations thereof in response to a predetermined state of said second counter.

40. An electronic circuit as in claim 37 wherein said sequential signal generator comprises:

an oscillatory loop connected pair of monostable circuits; and a second counter connected to count the outputs of at least one of the monostable circuits and to provide said sequential enable gating signals on respectively corresponding output lines as a function of the contents of said second counter, the output of at least one of said monostable circuits being connected to enable said decoder.

41. An electronic circuit as in claim 40 wherein said sequential signal generator further comprises a logic element connected in said oscillatory loop for inhibiting further oscillations thereof in response to a predetermined state of said second counter.

42. An electronic circuit as in claim 34 wherein said word windings are connected in a diode switched matrix thereby reducing the required number of said word winding current drivers and wherein said decoder comprises a first section corresponding to the rows of said diode switched matrix and a second section corresponding to the columns of said diode switched matrix.

43. A method of printing magnetic images in accordance with supplied digital data signals onto a magnetizable medium moving past a magnetic print head having first and second overlapping sets of coincident current windings comprising the steps of successively energizing different ones of said first set of windings, successively energizing different predetermined sub-sets of said second set of windings, in accordance with said supplied data signals, while each of the first set of windings is energized, successive areas of the head being magnetized with opposite polarity when energized for printing and said predetermined sub-sets comprise only windings associated with head areas that are separated from other like-polarized head areas by at least one like-polarized area thus increasing the distance between areas having the same polarity that may be energized simultaneously.

* * * * *